(12) United States Patent
Kim et al.

(10) Patent No.: US 7,543,312 B2
(45) Date of Patent: Jun. 2, 2009

(54) OPTICAL PICKUP DEVICE

(75) Inventors: Seok Jung Kim, Suwon-si (KR); Yong Han Yoon, Suwon-si (KR); Soo Han Park, Yongin-Si (KR); Jung Gug Pae, Yeongtong-Gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 11/455,634

(22) Filed: Jun. 20, 2006

(65) Prior Publication Data

US 2007/0050799 A1 Mar. 1, 2007

(30) Foreign Application Priority Data

Sep. 1, 2005 (KR) .................. 10-2005-0081306

(51) Int. Cl.
*G11B 7/085* (2006.01)
(52) U.S. Cl. ..................................... 720/683
(58) Field of Classification Search ............. 720/683, 720/669, 681, 685; 369/44.14, 44.15, 44.37
See application file for complete search history.

(56) References Cited

U.S. PATENT DOCUMENTS

| 6,895,593 | B2 * | 5/2005 | Kim et al. ............. 720/669 |
| 7,203,951 | B2 * | 4/2007 | Kawano et al. ......... 720/683 |
| 7,210,154 | B2 * | 4/2007 | Song et al. ............. 720/681 |
| 2003/0067848 | A1 | 4/2003 | Kabasawa et al. |
| 2005/0190663 | A1 * | 9/2005 | Kim et al. ............. 369/44.15 |
| 2005/0265141 | A1 * | 12/2005 | Pae et al. ............. 369/44.14 |
| 2006/0028935 | A1 * | 2/2006 | Mori et al. ............. 369/44.37 |
| 2006/0136955 | A1 * | 6/2006 | Kim et al. ............. 720/685 |

FOREIGN PATENT DOCUMENTS

JP 2003-109234 4/2003

* cited by examiner

*Primary Examiner*—Tianjie Chen
(74) *Attorney, Agent, or Firm*—Stein McEwen, LLP

(57) ABSTRACT

An optical pickup device is provided with a plurality of object lens corresponding to various kinds of optical discs having different recording densities, in which the structure of the optical pickup device is simplified and the size of the optical pickup device is minimized. The optical pickup device comprises a bobbin including an upper surface, at which first and second object lenses are mounted, an opened lower surface, and a first and second side surfaces supported by a supporting unit, the first and second side surfaces being opposite to each other, a first focus coil and a first tracking coil mounted at a third side surface of the bobbin, a second focus coil and a second tracking coil mounted at a fourth side surface of the bobbin, which is opposite to the third side surface, and magnets disposed opposite to the first and second focus coils and the first and second tracking coils.

20 Claims, 7 Drawing Sheets

OPTICAL PICKUP DEVICE

CROSS-REFERENCE TO RELATED APPLICATIONS

This application claims all benefits accruing under 35 U.S.C. §119 from Korean Patent Application No. 2005-81306, filed on Sep. 1, 2005 in the Korean Intellectual Property Office, the disclosure of which is incorporated by reference herein.

BACKGROUND OF THE INVENTION

1. Field of the Invention

The present invention relates to an optical pickup device that is capable of reading signals from an optical recording medium such as an optical disc or recording signals to the optical disc, and, more particularly, to an optical pickup device including a plurality of object lenses.

2. Related Art

Generally, an optical pickup device for use in an optical recording and/or reproducing apparatus is a device that irradiates a laser beam on an optical disc, such as a compact disc (CD) or a digital video disc (DVD), to read information from the optical disc or to record information on the optical disc. The optical pickup device includes a drive unit to drive an object lens in a radial direction of the optical disc to seek a track of the optical disc and to drive the object lens in the direction of an optical axis to control focus of the laser beam, when the laser beam irradiated on a recording layer of the optical disc is out of focus.

An example of such an optical pickup device is disclosed in Japanese Unexamined Patent Publication No. 2003-109234. The disclosed optical pickup device changes the position of an object lens to adjust the position where a laser beam is irradiated onto an optical disc. The optical pickup device includes focus coils symmetrically mounted at opposite sides of a bobbin and tracking coils symmetrically mounted at opposite sides of the focus coils. The focus coils and the tracking coils are disposed in a symmetrical fashion such that the weight balance is maintained. According to the disclosed optical pickup device, deviation in weight is eliminated, and, as a result, a drive force generated by coils is uniformly applied in all directions to accurately and easily perform focus correction of the laser beam. The disclosed optical pickup device is one form of optical pickup devices having a single object lens.

Recently, there has been increasingly a requirement for an optical pickup device that is capable of recording/reproducing information on/from various kinds of optical discs having different recording densities, such as compact disc (CD), a digital video disc (DVD), or a blu-ray disc (BD).

It is required, however, that such an optical pickup device have a plurality of object lenses corresponding to various kinds of optical discs, a plurality of optical paths be formed for the respective object lenses, and focus coils and tracking coils to correct focus of the laser beam be balanced. As a result, the structure of the optical pickup device is complicated, the manufacture of the optical pickup device is difficult and cost prohibitive, and the miniaturization of the optical pickup device is difficult and prone to inaccuracy.

SUMMARY OF THE INVENTION

Various aspects and example embodiments of the present invention provide an optical pickup device including a plurality of object lenses corresponding to various kinds of optical discs having different recording densities, while the structure of the optical pickup device is simplified and the size of the optical pickup device is minimized.

Additional aspects and/or advantages of the invention will be set forth in part in the description which follows and, in part, will be obvious from the description, or may be learned by practice of the invention.

In accordance with an aspect of the present invention, an optical pickup device is provided with: a bobbin including an upper surface, at which first and second object lenses are mounted, an opened lower surface, and a first and second side surfaces supported by a supporting unit, the first and second side surfaces being opposite to each other; a first focus coil and a first tracking coil mounted at a third side surface of the bobbin; a second focus coil and a second tracking coil mounted at a fourth side surface of the bobbin, which is opposite to the third side surface; and magnets disposed opposite to the first and second focus coils and the first and second tracking coils.

The third side surface has a first closed surface formed at one side part thereof and a first opening formed at the other side part thereof, and the fourth side surface has a second closed surface, which is diagonally opposite to the first closed surface, and a second opening, which is diagonally opposite to the first opening, and the first focus coil and the first tracking coil are mounted at the first closed surface, and the second focus coil and the second tracking coil are mounted at the second closed surface.

The magnets include a first magnet unit opposite to the first focus coil and the first tracking coil, and a second magnet unit opposite to the second focus coil and the second tracking coil, the first magnet unit includes a first magnet part, a second magnet part having polarization arrangement opposite to that of the first magnet part, a first boundary part to define the boundary between the first and second magnet parts in a tracking direction, and a second boundary part to define the boundary between the first and second magnet parts in a focus direction, and the second magnet unit includes a first magnet part, a second magnet part having polarization arrangement opposite to that of the first magnet part, a first boundary part to define the boundary between the first and second magnet parts in a tracking direction, and a second boundary part to define the boundary between the first and second magnet parts in a focus direction, the first and second focus coils being placed at the upper ends of the first magnet parts, and the first and second tracking coils being placed at the second boundary parts.

The first and second magnet units further include yokes to support the first and second magnet parts and to guide flow of magnetic flux generated from the first and second magnet parts, the yokes having bent parts to cover the upper ends of the first magnet parts.

The first and second focus coils have center lines aligned with the upper ends of the first magnet parts such that the upper parts of the first and second focus coils are opposite to the bent parts of the yokes, and the first and second tracking coils have center lines aligned with the second boundary parts.

The second boundary parts are perpendicular to the first boundary parts. The first and second object lenses are arranged in a radial direction of an optical disc. The supporting unit includes a plurality of elastic wires.

The optical pickup device further comprises: a first reflecting mirror mounted under the first object lens to guide a laser beam incident through the first opening to the first object lens; and a second reflecting mirror mounted under the second object lens to guide a laser beam incident through the second opening to the second object lens.

The first object lens is an object lens for compact discs (CDs) and digital video discs (DVDs), and the second object lens is an object lens for blu-ray discs (BDs).

In accordance with another aspect of the present invention, an optical pickup device is provided for recording and/or reproducing information on/from at least two types of optical discs having different recording densities. Such an optical pickup device comprises: a first object lens for irradiating a laser beam from a first light source onto one of the two types of optical discs; a second object lens for irradiating a laser beam from a second light source onto the other one of the two types of optical discs; a bobbin configured in the form of a rectangular parallelepiped, having an upper surface on which the first and second object lenses are mounted, and an opened lower surface; and a drive mechanism for moving the bobbin in tracking and focusing directions, wherein the drive mechanism comprises a first focus coil and a first tracking coil mounted at one side surface of the bobbin; a second focus coil and a second tracking coil mounted at the other side surface of the bobbin such that the first and second focus coils are diagonally opposite to the first and second tracking coils in a symmetrical fashion to maintain balance of the bobbin; and magnets disposed opposite to the first and second focus coils and the first and second tracking coils.

The one side surface of the bobbin has a first closed surface formed at one side portion thereof and a first opening formed at the other side portion thereof, and the other side surface of the bobbin has a second closed surface, which is diagonally opposite to the first closed surface, and a second opening, which is diagonally opposite to the first opening, such that optical paths for the first and second object lenses are diagonally opposite in a symmetrical fashion; and the first focus coil and the first tracking coil are mounted at the first closed surface, and the second focus coil and the second tracking coil are mounted at the second closed surface.

The magnets include a first magnet unit opposite to the first focus coil and the first tracking coil, and a second magnet unit opposite to the second focus coil and the second tracking coil. The first magnet unit includes a first magnet part, a second magnet part having polarization arrangement opposite to that of the first magnet part, a first boundary part to define a boundary between the first and second magnet parts in a tracking direction, and a second boundary part to define a boundary between the first and second magnet parts in a focus direction. Similarly, the second magnet unit includes a first magnet part, a second magnet part having polarization arrangement opposite to that of the first magnet part, a first boundary part to define a boundary between the first and second magnet parts in a tracking direction, and a second boundary part to define a boundary between the first and second magnet parts in a focus direction, the first and second focus coils being placed at the upper ends of the first magnet parts, and the first and second tracking coils being placed at the second boundary parts.

The first and second magnet units further include yokes to support the first and second magnet parts and to guide flow of magnetic flux generated from the first and second magnet parts, the yokes having bent parts to cover upper ends of the first magnet parts.

The first and second focus coils have center lines aligned with upper ends of the first magnet parts such that the upper parts of the first and second focus coils are opposite to the bent parts of the yokes, and the first and second tracking coils have center lines aligned with the second boundary parts.

The first type of optical discs selected for the first object lens is at least one selected from a CD-family optical disc and a DVD-family optical disc, and the second type of optical discs selected for the second object lens is a blu-ray disc (BD).

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
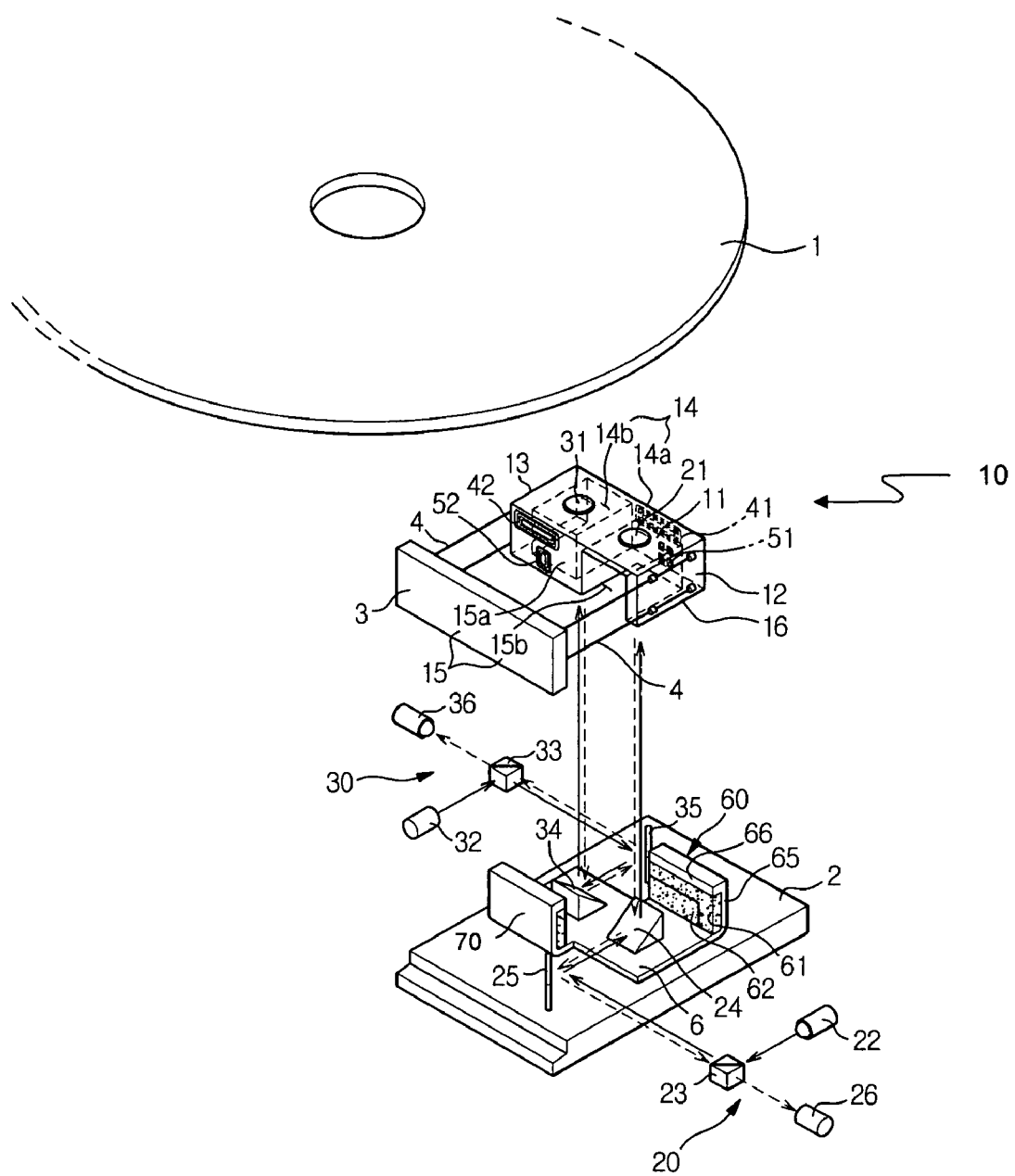
FIG. 1 is an exploded perspective view illustrating the structure of an optical pickup device according to an embodiment of the present invention.

Reference will now be made in detail to the embodiment of the present invention, examples of which are illustrated in the accompanying drawings, wherein like reference numerals refer to like elements throughout. The embodiment is described below to explain the present invention by referring to the figures.

FIG. 1 is an exploded perspective view illustrating the structure of an optical pickup device according to an embodiment of the present invention. Referring to FIG. 1, an optical pickup device includes a holder 3 fixed to a base 2; and a bobbin 10 supported by a plurality of suspension wires 4 to support a plurality of object lenses, such as a first object lens 21 and a second object lens 31, such that the bobbin 10 can be moved in a tracking direction and/or a focus direction; a first optical pickup part 20 arranged under the first object lens 21 to irradiate a laser beam having a beam spot and wavelength suitable to record/reproduce information on/from a first type of optical disc 10, such as a compact disc (CD) and a digital video disc (DVD); a second optical pickup part 30 arranged under the second object lens 31 to irradiate a laser beam having a beam spot and wavelength suitable to record/reproduce information on/from a second type of optical disc 10, such as a blu-ray disc (BD) having a different recording density from that of the compact disc (CD) and the digital video disc (DVD); and a drive unit including magnetic circuit coils and magnets for driving the bobbin 10 in two mutually orthogonal directions, that is, in a tracking direction and in a focus direction.

Figure 2:
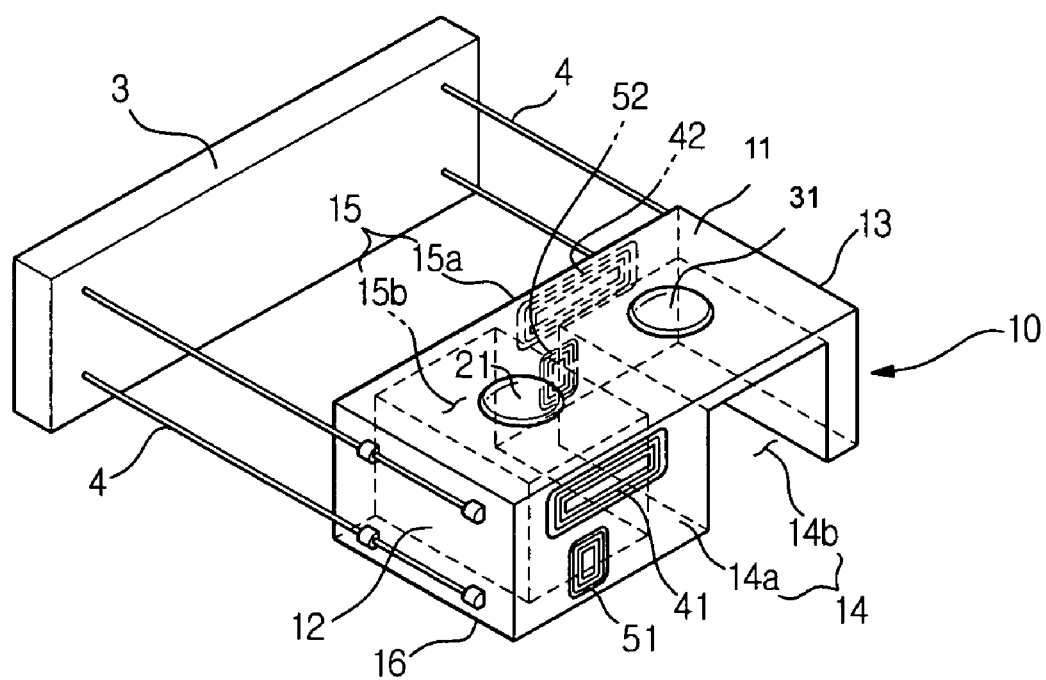
FIG. 2 is a perspective view illustrating the structure of a bobbin of an optical pickup device according to an embodiment of the present invention.

FIG. 2 is a perspective view illustrating the structure of a bobbin 10 of the optical pickup device according to an embodiment of the present invention. As shown in FIGS. 1 and 2, the bobbin 10 is configured in the form of a rectangular parallelepiped including an upper surface 11, a first object lens 21 and a second object lens 31 are mounted, respectively, at opposite sides on the upper surface 11, an opened lower surface 16, and first and second side surfaces 12 and 13 supported by the elastic suspension wires 4. The bobbin 10 is supported by the suspension wires 4 extended from the holder 3, such that the bobbin 10 can be moved upward and downward or from side to side within a predetermined distance relative to the holder 3. The first and second object lenses 21 and 31, which are mounted at the upper surface 11 of the bobbin 10, are arranged in a radial direction of an optical disc 1.

The bobbin 10 further includes a third side surface 14 and a fourth side surface 15, which is opposite to the third side surface 14. The third side surface 14 includes a first closed surface 14a formed at one side part thereof and a first opening 14b formed at the other side part thereof. Similarly, the fourth side surface 15 includes a second closed surface 15a formed at one side part thereof and a second opening 15b formed at the other side part thereof. The second closed surface 15a of the fourth side surface 15 is diagonally opposite to the first closed surface 14a of the third side surface 14, and the second opening 15b of the fourth side surface 15 is diagonally opposite to the first opening 14b of the third side surface 14. Consequently, as shown in FIGS. 1 and 3, an optical path is defined toward the second object lens 31 through the first opening 14b, and another optical path is defined toward the first object lens 21 through the second opening 15b.

Figure 3:
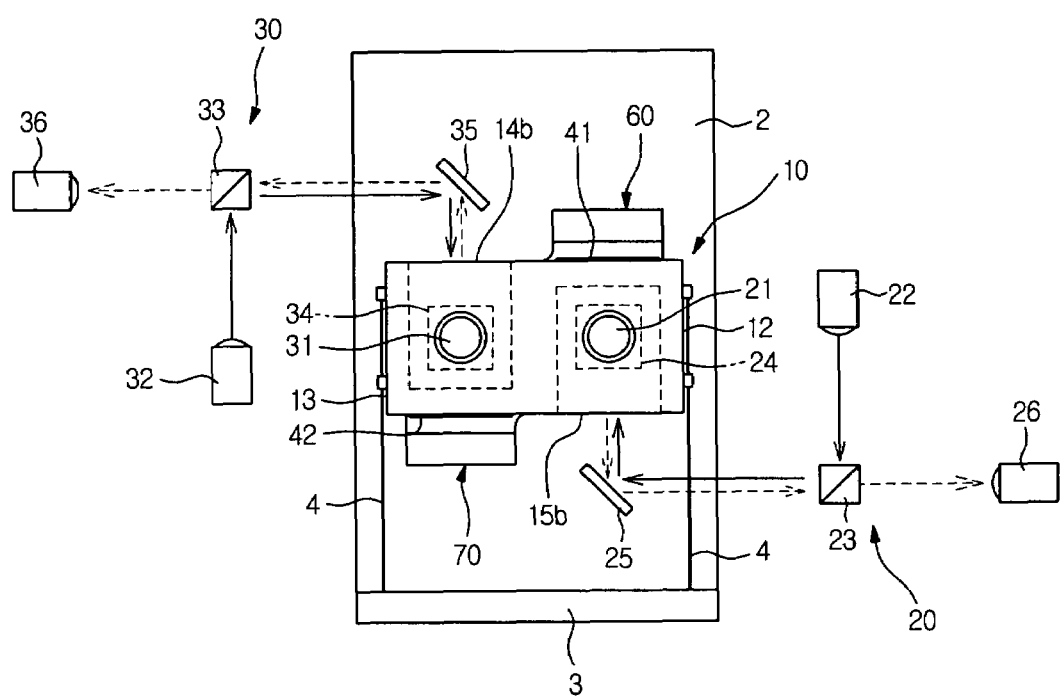
FIG. 3 is a plan view illustrating the structure of an optical pickup device according to an embodiment of the present invention.

Turning now to FIG. 3, the structure of an optical pickup device according to an embodiment of the present invention is further illustrated. As shown in FIGS. 1 and 3, the optical pickup device further includes a first optical pickup part 20 for the first object lens 21 and a second optical pickup part 30 for the second object lens 31.

The first optical pickup part 20 includes a first laser diode 22, a first half mirror 23, a first reflecting mirror 24, a third reflecting mirror 25, and a first photo diode 26. The first half mirror 23 receives a laser beam from the first laser diode 22, and transmits at least a portion of the laser beam, while reflecting a remainder portion of the laser beam. The first and third reflecting mirrors 24 and 25 guide the laser beam passing through the first half mirror 23 to the first object lens 21. Consequently, a laser beam emitted from the first laser diode 22 is incident on the third reflecting mirror 25 through the first half mirror 23. The laser beam reflected by the third reflecting mirror 25 is incident on the first reflecting mirror 24, which is mounted under the first object lens 21, through the second opening 15b of the bobbin 10. The laser beam reflected by the first reflecting mirror 24 is incident on the first object lens 21. The first object lens 21 condenses (focuses) the laser beam to form a beam spot on a recording layer of the optical disc 1. The beam reflected from the recording layer of the optical disc 1 is incident on the first photo diode 26 through the first object lens 21, the first reflecting mirror 23, the third reflecting mirror 25, and the first half mirror 23. The first photo diode 26 converts the beam into an electric signal, and outputs the converted electric signal. Consequently, information recorded on the optical disc 1 is read and reproduced.

The second optical pickup part 30 is similar to the first optical pickup part 20. The second optical pickup part 30 includes a second laser diode 32, a second half mirror 33, a second reflecting mirror 34, a fourth reflecting mirror 35, and a second photo diode 36. The second half mirror 33 receives a laser beam from the second laser diode 32, and transmits at least a portion of the laser beam, while reflecting a remainder portion of the laser beam. The second and fourth reflecting mirrors 34 and 35 guide the laser beam passing through the second half mirror 33 to the second object lens 31. Consequently, a laser beam emitted from the second laser diode 32 is incident on the fourth reflecting mirror 35 through the second half mirror 33. The laser beam reflected by the fourth reflecting mirror 35 is incident on the second reflecting mirror 34, which is mounted under the second object lens 31, through the first opening 14b of the bobbin 10. The laser beam reflected by the second reflecting mirror 34 is incident on the second object lens 31. The second object lens 31 condenses (focuses) the laser beam to form a beam spot on the recording layer of the optical disc 1. The second photo diode 36 converts the beam reflected from the optical disc 1 through the second object lens 31 into an electric signal, and outputs the converted electric signal. Consequently, information recorded on the optical disc 1 is read and reproduced.

The first object lens 21 and the first optical pickup part 20 are configured to form a beam spot and a beam wavelength suitable to read information recorded on a compact disc (CD) or a digital video disc (DVD) or to detect beam reflected from the CD or the DVD. In contrast, the second object lens 31 and the second optical pickup part 30 are configured to form a beam spot and a beam wavelength suitable to read information recorded on a blu-ray disc (BD) having high recording density or to detect beam reflected from the BD. Consequently, the optical pickup device according to the present invention corresponds to various kinds of optical disc 1 having different recording densities.

The optical pickup device further includes a drive unit to drive the bobbin 10, at which the object lenses 21 and 31 are mounted, in the tracking direction, that is, the radial direction of the optical disc 1 to seek a track of the optical disc 1 and to drive the bobbin 10 in the focusing direction, that is, the direction of an optical axis to control focus of the laser beam, when the laser beam incident on the recording layer of the optical disc 1 is out of focus. The drive unit includes magnetic circuit coils mounted at the bobbin 10 and magnets disposed opposite to the magnetic circuit coils.

As shown in FIGS. 1 and 2, the magnetic circuit coils include a first focus coil 41 mounted at the upper part of the first closed surface 14a of the third side surface 14, a first tracking coil 51 mounted at the lower part of the first closed surface 14a, a second focus coil 42 mounted at the upper part of the second closed surface 15a of the fourth side surface 15, and a second tracking coil 52 mounted at the lower part of the second closed surface 15a. Specifically, the first and second focus coils 41 and 42 and the first and second tracking coils 51 and 52b are mounted at the bobbin 10 such that the first and second focus coils 41 and 42 are diagonally opposite to the first and second tracking coils 51 and 52b in a symmetric fashion. Consequently, the weights at the opposite side parts of the bobbin 10 are the same, and, as a result, the balance of the bobbin 10 is maintained.

The first and second focus coils 41 and 42 are wound such that the horizontal sides of the first and second focus coils 41 and 42 are longer than the vertical sides of the first and second focus coils 41 and 42, and the first and second tracking coils 51 and 52 are wound such that the vertical sides of the first and second tracking coils 51 and 52 are longer than the horizontal sides of the first and second tracking coils 51 and 52. The coils may be bulk-type coils manufactured by winding copper wires. However, the coils are preferably fine pattern coils manufactured by patterning coils on films to simplify the structure of the optical pickup device and decrease the size of the optical pickup device. The fine pattern coils are thin and light, which contributes to miniaturization of the optical pickup device.

As shown in FIG. 1, the magnets include a first magnet unit 60 opposite to the first closed surface 14a, at which the first focus coil 41 and the first tracking coil 51 are mounted, and a second magnet unit 70 opposite to the second closed surface 15a, at which the second focus coil 42 and the second tracking coil 52 are mounted.

Figure 4:
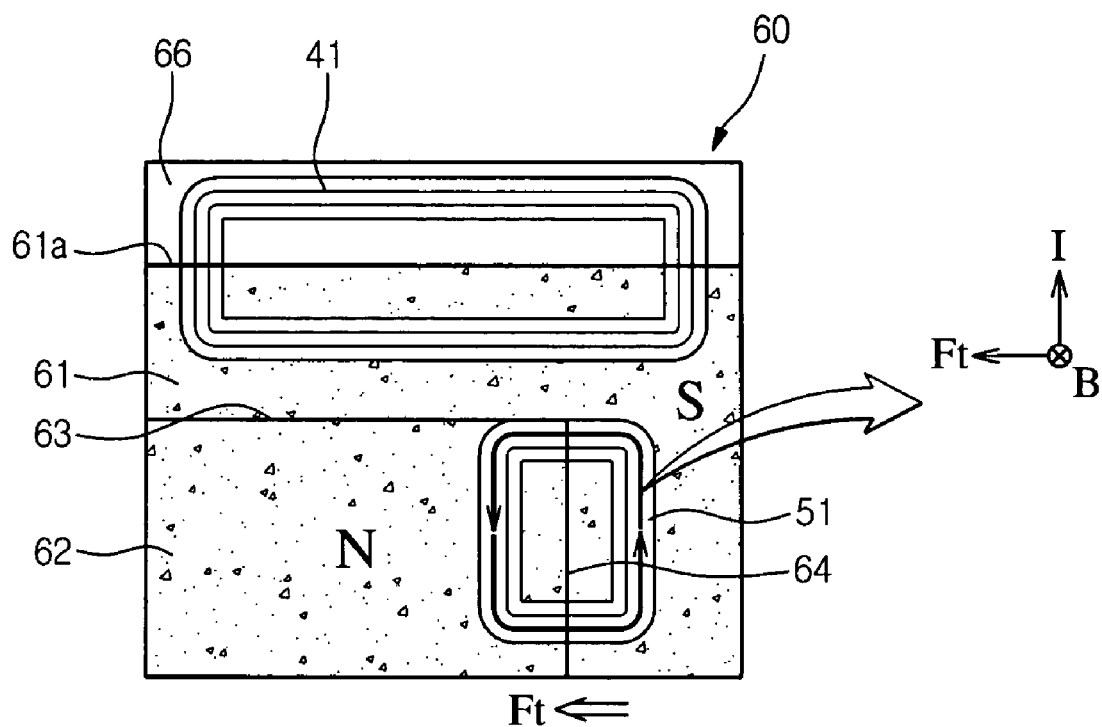
FIGS. 4 and 5 show an example arrangement of magnetic circuit coils and a magnet unit of the optical pickup device to illustrate a drive principle of the optical pickup device in a tracking direction according to an embodiment of the present invention.
Figure 5:
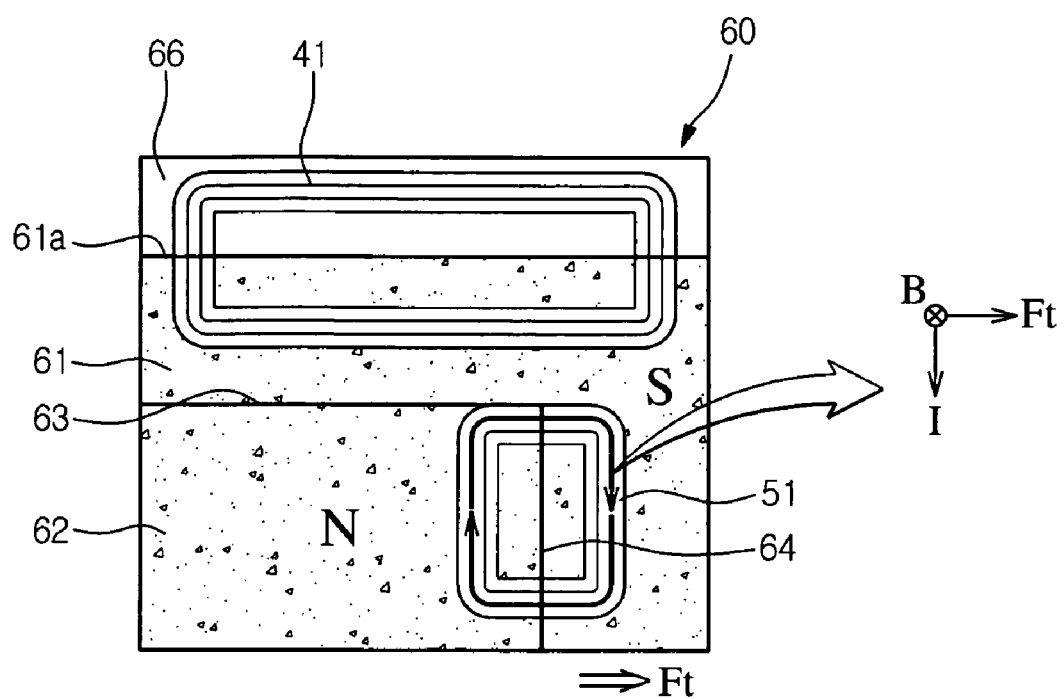

FIGS. 4 and 5 show an example arrangement of magnetic circuit coils and a magnet unit of the optical pickup device to illustrate a drive principle of the optical pickup device in a tracking direction according to an embodiment of the present invention. As shown in FIG. 4, the first magnet unit 60 includes a first magnet part 61, a second magnet part 62 having polarization arrangement opposite to that of the first magnet part 61, a first boundary part 63 to define the boundary between the first and second magnet parts 61 and 62 in a tracking direction, and a second boundary part 64 to define the boundary between the first and second magnet parts 61 and 62 in a focus direction. The second boundary part 64 extends downward from the first boundary part 63 such that the second boundary part 64 is perpendicular to the first boundary part 63. Consequently, the first magnet part 61 is configured in the form of a "⅂," and therefore, the first magnet part 61 covers the upper surface and one of the side surfaces of the second magnet part 62. Furthermore, as shown in FIG. 4, the front surface of the first magnet part 61 has S pole, and the front surface of the second magnet part 62 has N pole. Correspondingly, the rear surface of the first magnet part 61 has N pole, and the rear surface of the second magnet part 62 has N pole. As shown in FIG. 1, the first magnet unit 60 further includes a yoke 65 extending upward from a yoke plate 6 fixed to the base 2 to support the rear surfaces of the first and second magnet parts 61 and 62 and to guide flow of magnetic flux. The yoke 65 has a bent part 66 to cover the upper end of the first magnet part 61. Although not concretely shown, the second magnet unit 70 has the same shape as the first magnet unit 60.

As shown in FIG. 4, the first focus coil 41, which is opposite to the first magnet unit 60, is disposed such that the horizontal center line of the first focus coil 41 is aligned with the upper end 61a of the first magnet part 61 to perform a focusing operation through interaction between current flowing through the first focus coil 41 and magnetic flux generated from the first magnet unit 60. Specifically, the lower part of the first focus coil 41 is opposite to the first magnet part 61 such that the lower part of the first focus coil 41 comes into contact with the magnetic flux of the first magnet part 61, and the upper part of the first focus coil 41 is opposite to the bent part 66 of the yoke 65 such that the upper part of the first focus coil 41 comes into contact with the magnetic flux flowing through the bent part 66, by which a polarization effect is generated.

The first tracking coil 51 is disposed such that the vertical center line of the first tracking coil 51 is aligned with the second boundary part 64 to perform a tracking operation through interaction between current flowing through the first tracking coil 51 and magnetic flux generated from the first magnet unit 60. Although not shown, the second focus coil 42 and the second tracking coil 52, which are opposite to the second magnet unit 70 are arranged in the same manner as the first focus coil 41 and the first tracking coil 51.

A drive principle of the optical pickup device in a tracking direction will now be described with reference to FIGS. 4 and 5 as follows.

When current flows counterclockwise through the first tracking coil 51, a magnetic force Ft is applied to the first tracking coil 51 in a left direction, as shown in FIG. 4. In contrast, when current flows clockwise through the first tracking coil 51, a magnetic force Ft is applied to the first tracking coil 51 in a right direction, as shown in FIG. 5. Since the second magnet unit 70 and the second tracking coil 52 have the same arrangement as the first magnet unit 60 and the first tracking coil 51, a magnetic force is applied to the second tracking coil 52 in the same fashion as the first tracking coil 51. Consequently, the bobbin 10, at which the first and second object lenses 21 and 31 are mounted, can be moved in the tracking direction according to the above-described drive principle, and, as a result, a laser beam is shifted in the tracking direction such that focus of the laser beam is corrected.

Figure 6:
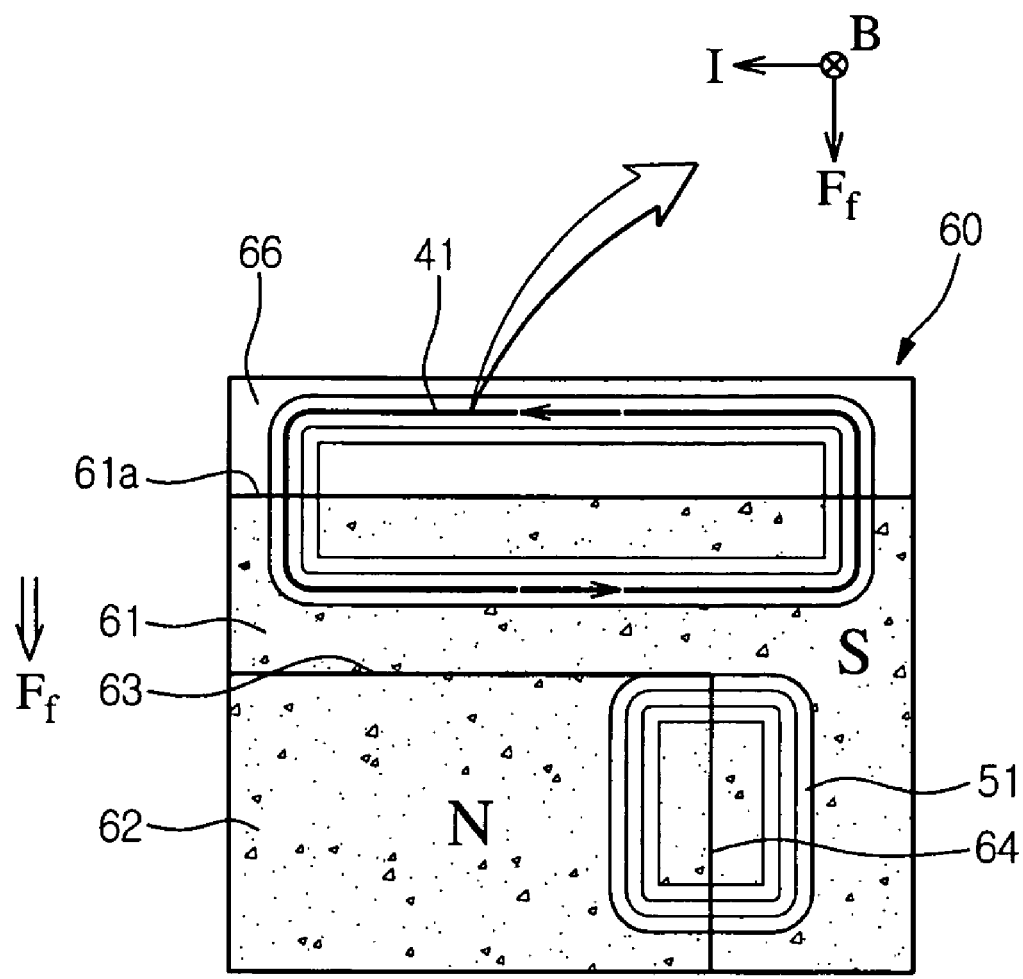
FIGS. 6 and 7 show an example arrangement of magnetic circuit coils and a magnet unit of the optical pickup device to illustrate a drive principle of the optical pickup device in a focus direction according to an embodiment of the present invention.
Figure 7:
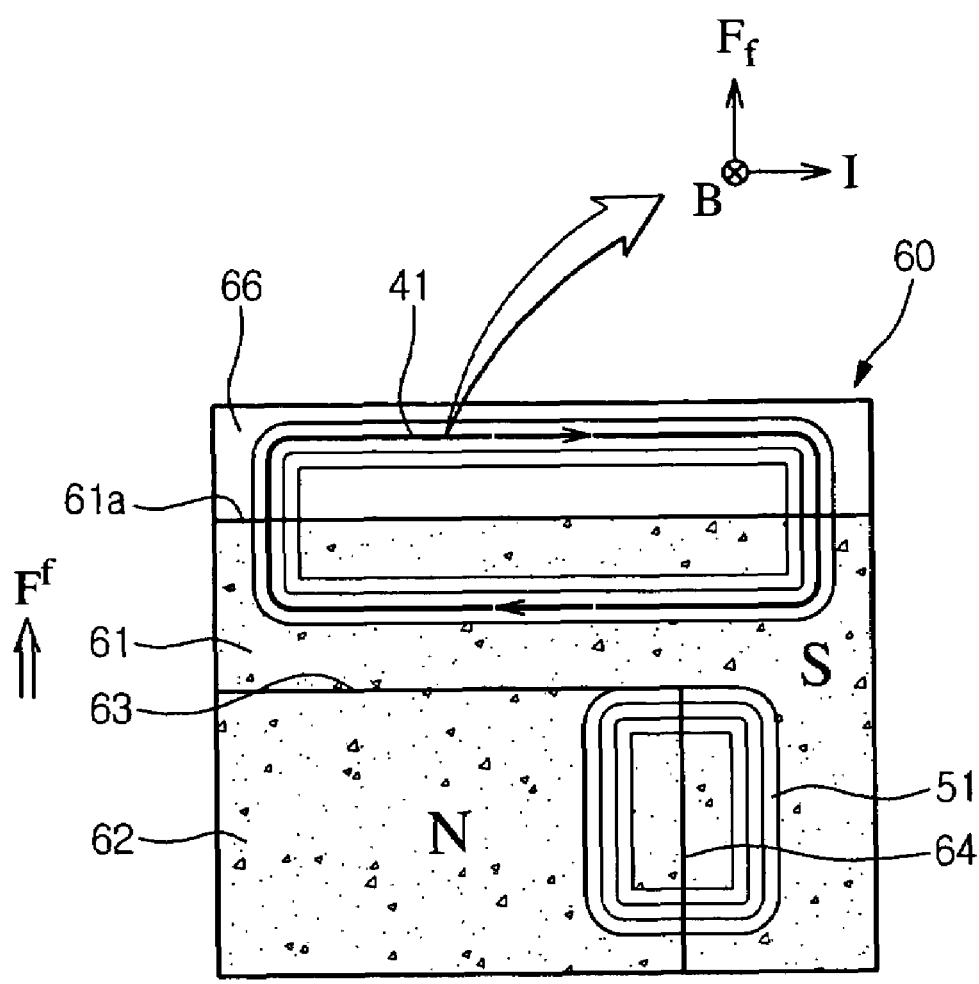

FIGS. 6 and 7 illustrate a drive principle of the optical pickup device in a focus direction according to an embodiment of the present invention. When current flows counterclockwise through the first focus coil 41, as shown in FIG. 6, a magnetic force Ff is applied to the first focus coil 41 in a downward direction (a direction in which the distance between the optical disc and the object lenses is increased). In contrast, when current flows clockwise through the first focus coil 41, as shown in FIG. 7, a magnetic force Ff is applied to the first focus coil 41 in an upward direction (a direction in which the distance between the optical disc and the object lenses is decreased). Since the second magnet unit 70 and the second focus coil 42 have the same arrangement as the first magnet unit 60 and the first focus coil 41, a magnetic force is applied to the second focus coil 42 in the same fashion as the first focus coil 41. Consequently, the bobbin 10, at which the first and second object lenses 21 and 31 are mounted, can be moved in the focus direction according to the above-described drive principle, and, as a result, focus of the laser beam is adjusted.

As apparent from the above description, the first object lens and the second object lens are mounted at the upper surface of the bobbin. Consequently, the present invention has the effect of reading or recording information from or to optical discs having different recording densities.

The magnetic circuit coils, which are mounted at the bobbin 10 to correct focus of the laser beam, are diagonally opposite to each other in a symmetric fashion, and the optical paths for the first and second object lenses 21 and 31 are also diagonally opposite to each other in a symmetric fashion. Consequently, the present invention has the effect of maintaining the balance of the bobbin 10, simplifying the structure of the optical pickup device, and decreasing the size of the optical pickup device.

The first and second focus coils and the first and second tracking coils are fine pattern coils manufactured by patterning coils on films, and therefore, the weight and the size of the drive part are decreased. Consequently, the present invention has the effect of performing focus correction of the laser beam with high sensitivity.

Furthermore, the first and second magnet units include the first and second magnet parts configured to have polarization arrangement on the same plane. Consequently, the present invention has the effect of simplifying the structure of the optical pickup device and minimizing the size of the optical pickup device.

While the present invention has been particularly shown and described with reference to exemplary embodiments thereof, it will be understood by those of ordinary skill in the art that various changes in form and details may be made therein without departing from the spirit and scope of the present invention. For example, the first object lens 21, as shown in FIGS. 1-3, is used to record and/or reproduce data on/from at least one type of high density optical disc having different recording densities such as CD-family optical discs and DVD-family optical discs. In contrast to the first object lens 21, the second object lens 31 is used to record and/or reproduce data on/from even higher density optical discs such as blu-ray discs (BDs). However, the plurality of object lenses 21 and 21 may comprise three or more object lenses used to record and/or reproduce three or more types of optical discs having different recording densities. Similarly, multiple optical pickup components may be installed to support multiple types of optical discs having different recording densities. Likewise, different types of advanced optical discs and next generation DVDs having different recording densities can also be implemented in the same manner as described. Accordingly, it is intended, therefore, that the present invention not be limited to the various example embodiments disclosed, but that the present invention includes all embodiments falling within the scope of the appended claims.

What is claimed is:

1. An optical pickup device comprising:
a bobbin including an upper surface, at which first and second object lenses are mounted, an opened lower surface, and first and second side surfaces supported by a supporting unit, the first and second side surfaces being opposite to each other;
a first focus coil and a first tracking coil mounted at a third side surface of the bobbin;
a second focus coil and a second tracking coil mounted at a fourth side surface of the bobbin, which is opposite to the third side surface; and
magnets disposed opposite to the first and second focus coils and the first and second tracking coils,
wherein the first and second object lenses are mounted on the upper surface of the bobbin to support irradiation of a laser beam onto different types of optical media having different recording densities for data recording and/or reproduction;
wherein the third side surface of the bobbin has a first closed surface formed at one side part thereof and a first opening formed at the other side part thereof, and the fourth side surface of the bobbin has a second closed surface, which is diagonally opposite to the first closed surface, and a second opening, which is diagonally opposite to the first opening, and
wherein the first focus coil and the first tracking coil are mounted at the first closed surface, and the second focus coil and the second tracking coil are mounted at the second closed surface.

2. The device according to claim 1, further comprising a drive mechanism for driving the bobbin in tracking and focusing directions.

3. The device according to claim 2, wherein the first and second object lenses are arranged in a radial direction of an optical disc.

4. The device according to claim 3, further comprising:
a first reflecting mirror mounted under the first object lens to guide a laser beam incident through the first opening to the first object lens; and
a second reflecting mirror mounted under the second object lens to guide a laser beam incident through the second opening to the second object lens.

5. The device according to claim 3, wherein the first object lens is an object lens for compact discs (CDs) and digital video discs (DVDs), and the second object lens is an object lens for blu-ray discs (BDs).

6. The device according to claim 1, wherein:
the magnets include a first magnet unit opposite to the first focus coil and the first tracking coil, and a second magnet unit opposite to the second focus coil and the second tracking coil,
the first magnet unit includes a first magnet part, a second magnet part having polarization arrangement opposite to that of the first magnet part, a first boundary part to define the boundary between the first and second magnet parts in a tracking direction, and a second boundary part to define the boundary between the first and second magnet parts in a focus direction, and
the second magnet unit includes a first magnet part, a second magnet part having polarization arrangement opposite to that of the first magnet part, a first boundary part to define the boundary between the first and second magnet parts in a tracking direction, and a second boundary part to define the boundary between the first and second magnet parts in a focus direction,
the first and second focus coils being placed at the upper ends of the first magnet parts, and the first and second tracking coils being placed at the second boundary parts.

7. The device according to claim 6, wherein:
the first and second magnet units further include yokes to support the first and second magnet parts and to guide flow of magnetic flux generated from the first and second magnet parts, the yokes having bent parts to cover the upper ends of the first magnet parts.

8. The device according to claim 7, wherein:
the first and second focus coils have center lines aligned with the upper ends of the first magnet parts such that the upper parts of the first and second focus coils are opposite to the bent parts of the yokes, and
the first and second tracking coils have center lines aligned with the second boundary parts.

9. The device according to claim 6, wherein the second boundary parts are perpendicular to the first boundary parts.

10. The device according to claim 1, wherein the supporting unit includes a plurality of elastic members for movably supporting the bobbin in tracking and focus directions.

11. An optical pickup device used for recording and/or reproducing information on/from at least two types of optical discs having different recording densities, the optical pickup device comprising:
a first object lens for irradiating a laser beam from a first light source onto one of the two types of optical discs;
a second object lens for irradiating a laser beam from a second light source onto the other one of the two types of optical discs;
a bobbin configured in the form of a rectangular parallelepiped, having an upper surface on which the first and second object lenses are mounted, and an opened lower surface; and
a drive mechanism for moving the bobbin in tracking and focusing directions, wherein the drive mechanism comprises a first focus coil and a first tracking coil mounted at one side surface of the bobbin; a second focus coil and a second tracking coil mounted at the other side surface of the bobbin such that the first focus coil and the first tracking coil are diagonally opposite to the second focus coil and the second tracking coil in a symmetrical fashion to maintain balance of the bobbin; and magnets disposed opposite to the first and second focus coils and the first and second tracking coils.

12. The device according to claim 11, wherein:
the one side surface of the bobbin has a first closed surface formed at one side portion thereof and a first opening formed at the other side portion thereof, and the other side surface of the bobbin has a second closed surface, which is diagonally opposite to the first closed surface, and a second opening, which is diagonally opposite to the first opening, such that optical paths for the first and second object lenses are diagonally opposite in a symmetrical fashion; and
the first focus coil and the first tracking coil are mounted at the first closed surface, and the second focus coil and the second tracking coil are mounted at the second closed surface.

13. The device according to claim 12, wherein:
the magnets include a first magnet unit opposite to the first focus coil and the first tracking coil, and a second magnet unit opposite to the second focus coil and the second tracking coil,
the first magnet unit includes a first magnet part, a second magnet part having polarization arrangement opposite to that of the first magnet part, a first boundary part to define a boundary between the first and second magnet parts in a tracking direction, and a second boundary part to define a boundary between the first and second magnet parts in a focus direction, and
the second magnet unit includes a first magnet part, a second magnet part having polarization arrangement opposite to that of the first magnet part, a first boundary part to define a boundary between the first and second magnet parts in a tracking direction, and a second boundary part to define a boundary between the first and second magnet parts in a focus direction,
the first and second focus coils being placed at the upper ends of the first magnet parts, and the first and second tracking coils being placed at the second boundary parts.

14. The device according to claim 13, wherein:
the first and second magnet units further include yokes to support the first and second magnet parts and to guide flow of magnetic flux generated from the first and second magnet parts, the yokes having bent parts to cover upper ends of the first magnet parts.

15. The device according to claim 14, wherein:
the first and second focus coils have center lines aligned with upper ends of the first magnet parts such that the upper parts of the first and second focus coils are opposite to the bent parts of the yokes, and
the first and second tracking coils have center lines aligned with the second boundary parts.

16. The device according to claim 15, wherein the second boundary parts are perpendicular to the first boundary parts.

17. The device according to claim 13, further comprising:
a first reflecting mirror mounted under the first object lens to guide a laser beam from the first light source incident through the first opening to the first object lens;
a second reflecting mirror mounted under the second object lens to guide a laser beam from the second light source incident through the second opening to the second object lens.

18. The device according to claim 17, wherein the one of the two types of optical discs selected for the first object lens is at least one selected from a CD-family optical disc and a DVD-family optical disc, and the other one of the two types of optical discs selected for the second object lens is a blu-ray disc (BD).

19. The device according to claim 11, wherein the first and second focus coils and the first and second tracking coils are fine pattern coils manufactured by patterning coils on films.

20. An optical pickup device used for recording and/or reproducing information on/from different optical media having different recording densities, the optical pickup device comprising:
a first object lens to irradiate a laser beam from a first light source onto a first optical medium;
a second object lens to irradiate a laser beam from a second light source onto a second optical medium;
a bobbin having the first and second object lenses are mounted thereon; and
a drive mechanism arranged to move the bobbin in tracking and focusing directions, wherein the drive mechanism comprises:
a first focus coil and a first tracking coil mounted at one side surface of the bobbin;
a second focus coil and a second tracking coil mounted at the other side surface of the bobbin such that the first focus coil and the first tracking coil are diagonally opposite to the second focus coil and the second tracking coil in a symmetrical fashion to maintain balance of the bobbin; and
magnets disposed opposite to the first and second focus coils and the first and second tracking coils.

* * * * *